United States Patent [19]

Clopton et al.

[11] Patent Number: 5,503,259
[45] Date of Patent: Apr. 2, 1996

[54] ELECTRIFICATION MODULE FOR CONVEYOR

[75] Inventors: Robert T. Clopton, Magnolia; Mike H. Goad, Glasgow, both of Ky.

[73] Assignee: Tekno, Inc., Cave City, Ky.

[21] Appl. No.: 518,013

[22] Filed: Aug. 22, 1995

[51] Int. Cl.$^6$ .............................. B60L 1/00; B60M 1/36
[52] U.S. Cl. ............................................ 191/6; 191/15
[58] Field of Search .................... 191/2, 6, 8, 14, 191/15, 20, 21, 25, 22 R, 29 R, 32, 30, 59.1; 307/9.1, 42

[56] References Cited

U.S. PATENT DOCUMENTS

| | | | |
|---|---|---|---|
| 2,821,146 | 1/1958 | Mahrle et al. | 191/6 X |
| 2,921,146 | 1/1960 | Ericson . | |
| 3,002,059 | 9/1961 | Mageoch | 191/6 |
| 3,114,441 | 12/1963 | Sprigings . | |
| 3,123,191 | 3/1964 | Sprigings . | |
| 3,422,387 | 1/1969 | Sprigings et al. . | |
| 3,489,981 | 1/1970 | Corl et al. | 191/23 R X |
| 3,503,032 | 3/1970 | Routh et al. | 191/23 R X |
| 3,801,751 | 4/1974 | Ross, Jr. . | |
| 3,826,880 | 7/1974 | Ross, Sr. . | |
| 3,877,553 | 4/1975 | Ross | 191/49 |
| 3,918,557 | 11/1975 | Ross, Sr. . | |
| 4,050,555 | 9/1977 | Ross, Jr. . | |
| 4,067,257 | 1/1978 | Pentith | 191/25 X |
| 4,084,301 | 4/1978 | Ross . | |
| 4,258,835 | 3/1981 | Ross, Sr. . | |
| 4,267,906 | 5/1981 | Fischer | 191/59.1 X |
| 4,400,592 | 8/1983 | Ross, Sr. . | |
| 4,428,466 | 1/1984 | Mayer . | |
| 4,550,231 | 10/1985 | Ross, Sr. . | |
| 5,117,072 | 5/1992 | White | 191/6 X |
| 5,449,056 | 9/1995 | Ross | 191/6 |

FOREIGN PATENT DOCUMENTS

| | | | |
|---|---|---|---|
| 1174023 | 11/1958 | France | 191/25 |
| 687367 | 2/1953 | United Kingdom | 191/23 |

Primary Examiner—David A. Bucci
Assistant Examiner—Scott L. Lowe
Attorney, Agent, or Firm—Wheat, Camoriano, Smith & Beres

[57] ABSTRACT

A conveyor includes electrification rails and modules mounted on those rails to provide electricity to a pallet, so that appliances being carried on the pallet can be plugged in as they travel along the conveyor. The modules include an improved T-shaped shoe for contacting the bottom surface of the pallet, toe bars which prevent the shoe from pivoting sideways as the pallet pushes on the shoe, and a switch for turning power to the shoe on and off, depending upon whether there is a pallet on top of the shoe.

10 Claims, 8 Drawing Sheets

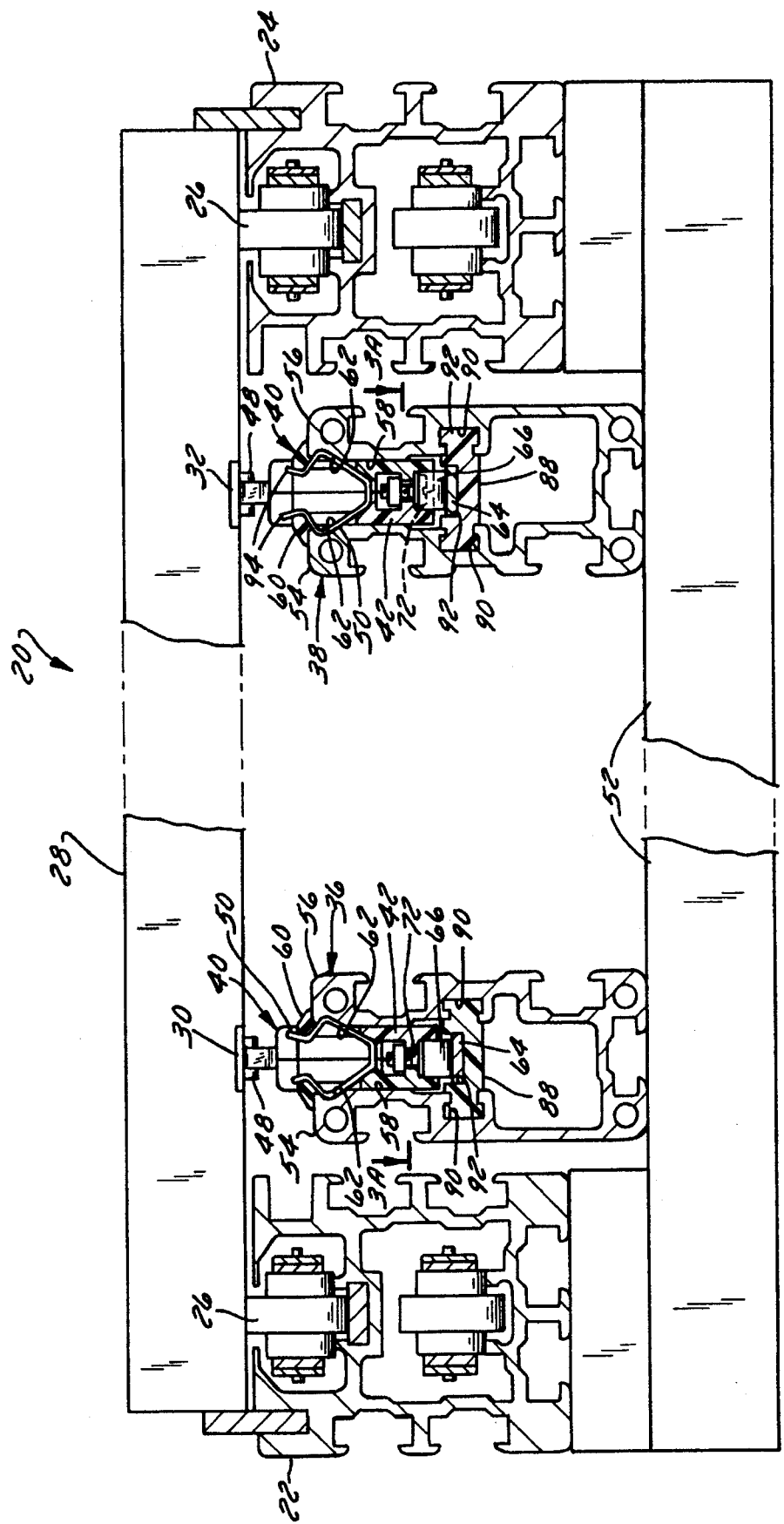

ELECTRIFICATION MODULE FOR CONVEYOR

BACKGROUND OF THE INVENTION

The present invention relates to conveyors, and, in particular, to a module for providing electricity to a pallet carried on the conveyor.

When electrical appliances are assembled, the assembly is often done on a conveyor line. The appliance is placed on a pallet, and the pallet travels along the conveyor, from one station to another, with different parts of the assembly taking place at different stations. In many cases, it is desirable to be able to provide electricity to the appliances as they travel along the conveyor and as they are assembled. Appliances for which this is desirable include televisions, clothes dryers, window air conditioners, and so forth. The purpose of electrification modules is to provide electricity to the pallets on the conveyor. The appliances can then be plugged into the pallet on which they travel during the assembly process.

There have been some problems with the electrification modules in the past, many of which are solved by the present invention. For example, the shoes which provide electrical contact between the module and the pallet generally provide a relatively small surface area for contacting the pallet. They also wear down, and, once they have worn to a certain point, they stop making good contact with the pallet and have to be replaced. Removing the modules from their frame in order to replace the shoes is often difficult. Also, the shoes are spring-loaded, and the pallets are heavy, so there has been a problem with the shoes pivoting to the side as a heavy pallet passes over, thereby losing contact with the pallet. Also, in the prior art, pallets generally can pass over a shoe only in one direction, because the shoe cannot withstand the force coming from a pallet in the reverse direction.

SUMMARY OF THE INVENTION

The present invention provides solutions to many of the problems of prior art electrification modules.

The present invention provides a spring-biased shoe which has a substantially T-shaped cross-section in order to provide a large surface area for contacting the pallet. This T-shaped cross-section also provides a visual indicator of wear, so it is obvious to the conveyor operator at a glance how much the shoes are wearing and when they will require replacement.

The present invention also provides forward and rear toe bars, which prevent the shoe from pivoting to the side as a load passes over the shoe, while not interfering with the vertical movement of the shoe. These toe bars also provide support to permit a pallet to pass over the shoe both in the forward and backward directions.

The present invention also provides a frame and mounting arrangement for the electrification module which permits the module to be readily inserted and removed from the top of the frame.

BRIEF DESCRIPTION OF THE DRAWINGS

FIG. 3 is a front sectional view partially broken away of the conveyor of FIG. 1;

DESCRIPTION OF THE PREFERRED EMBODIMENTS

Figure 1:
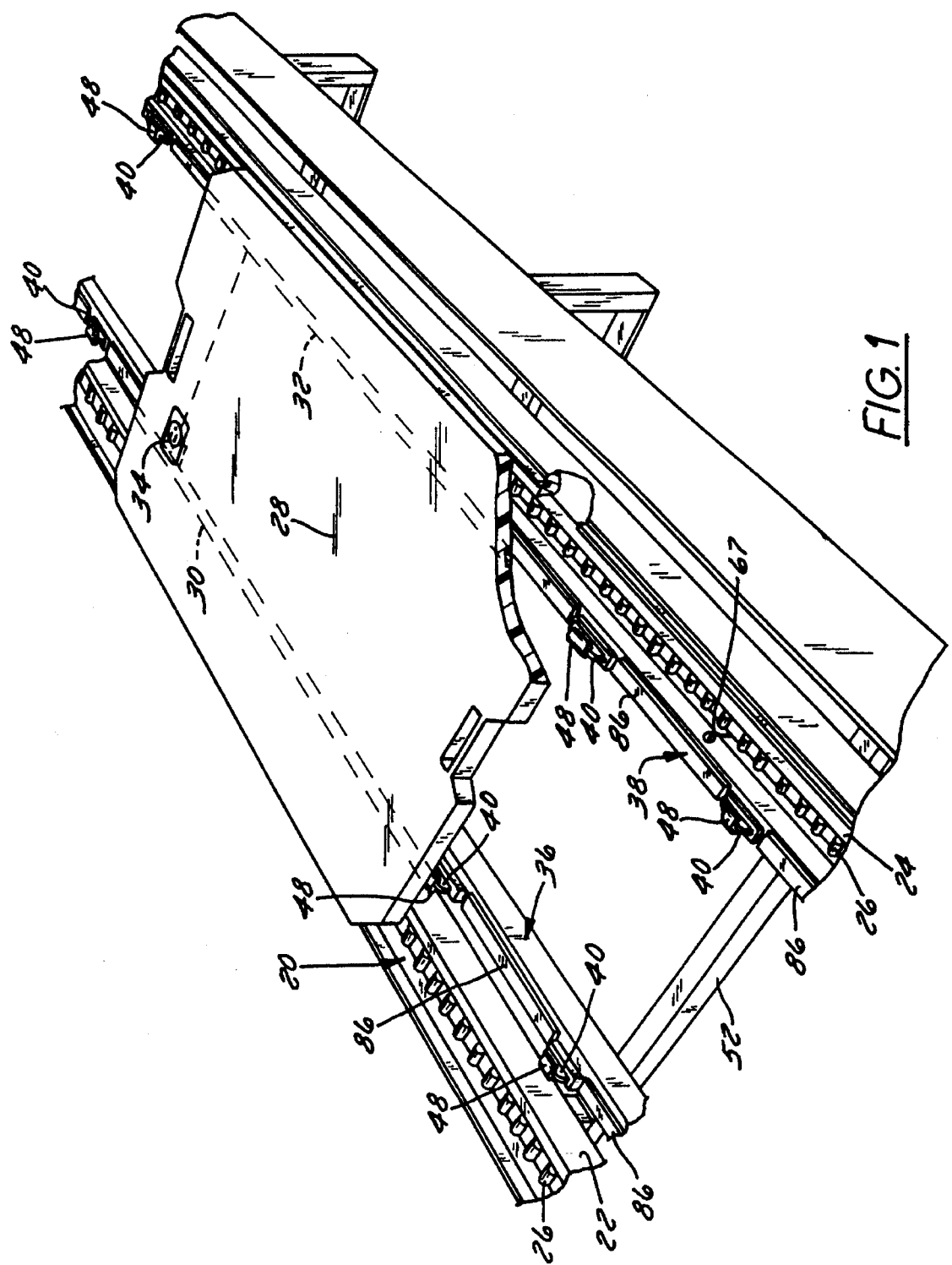
FIG. 1 is a broken-away perspective view of a conveyor made in accordance with the present invention.

FIG. 1 shows a conveyor 20, made in accordance with the present invention. The conveyor 20 includes left and right rails 22, 24, which carry roller chains 26. The chains 26 carry pallets along the conveyor 20, such as the pallet 28, shown in FIG. 1.

The pallet 28 has conductive strips 30, 32 on its bottom surface, shown in phantom in FIG. 1. These conductive strips 30, 32 are electrically connected to an outlet 34. An electrical appliance (not shown) which is carried on the pallet 28 can be plugged into the outlet 34 and can be powered as it travels along the conveyor 20.

In order to transmit power to the pallet 28 and other pallets carried on the conveyor 20, there are two electrification rails 36, 38 extending parallel to and inside of the conveyor rails 22, 24. Each of the electrification rails 36, 38 has a plurality of electrification modules 40, which contact the strips 30, 32 of the pallet 28 as the pallet 28 passes over the modules 40, to transmit electricity to the pallet 28. The manner in which electricity flows along the electrification rails 36, 38 to the modules 40 will be shown in detail later. Electricity flows into one rail 36, along that rail 36, through one or more modules 40 to the strip 30, to one side of the outlet 34, through the appliance (not shown), to the other side of the outlet 34, to the other strip 32, to one or more modules 40 on the other rail 38, along the other rail 38, and out the other rail 38.

Figure 2:
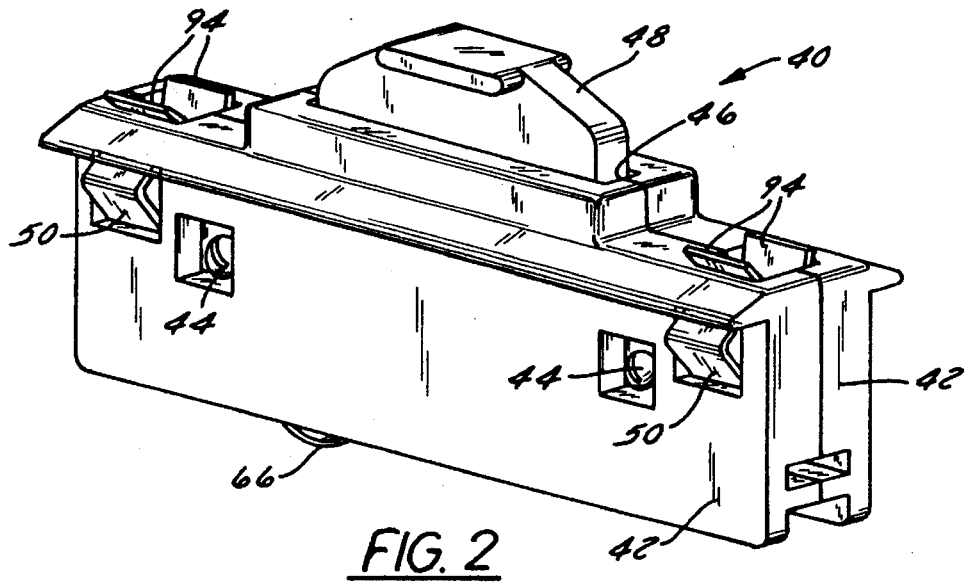
FIG. 2 is a perspective view of an electrification module from the conveyor of FIG. 1.

FIG. 2 is a perspective view of one of the modules 40. The module 40 includes a two-piece housing 42, with the two pieces connected together by screws 44. The housing 42 has an opening 46 in its top, through which projects an electrically-conductive shoe 48. The shoe 48 is spring-biased upwardly, as will be described later. The module 40 includes forward and rear clips 50, which project out the top and the sides of the module 40.

Figure 3A:
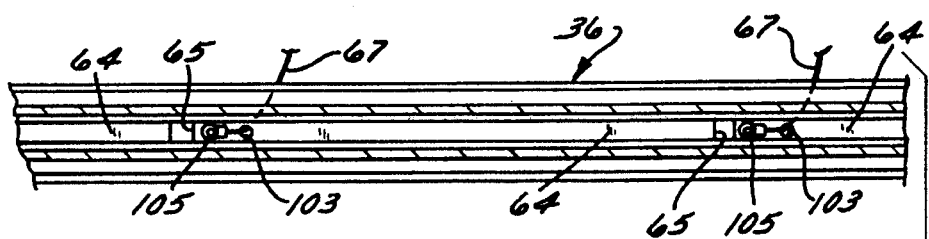
FIG. 3A is a view taken along the section 3A—3A of FIG. 3.
Figure 3A:
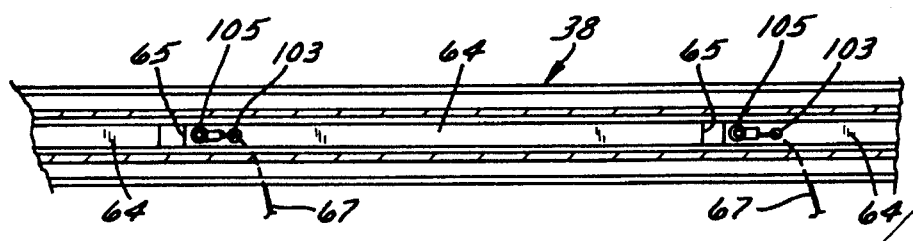

Looking now at FIG. 3, it can be seen that the conveyor rails 22, 24 and the electrification rails 36, 38 are mounted on the same cross member 52. The pallet 28 is carried by the chains 26, and the conductive strips 30, 32 on the bottom surface of the pallet 28 contact the shoes 48 of the respective left and right modules 40. Each of the electrification rails 36, 38 has two sides 54, 56, which define a space 58 between them, into which the modules 40 fit, with the shoes 48 projecting out of the top opening 60 between the sides 54, 56. Each of the sides 54, 56 defines a V-shaped groove 62 adjacent to the space 58, and the clips 50 of the modules 40 fit into those grooves 62 to hold the modules 40 in place on the electrification rails 36, 38. Each electrification rail 36, 38 supports a conducting strip 64, which carries electricity along the respective rail 36, 38.

Figure 4:
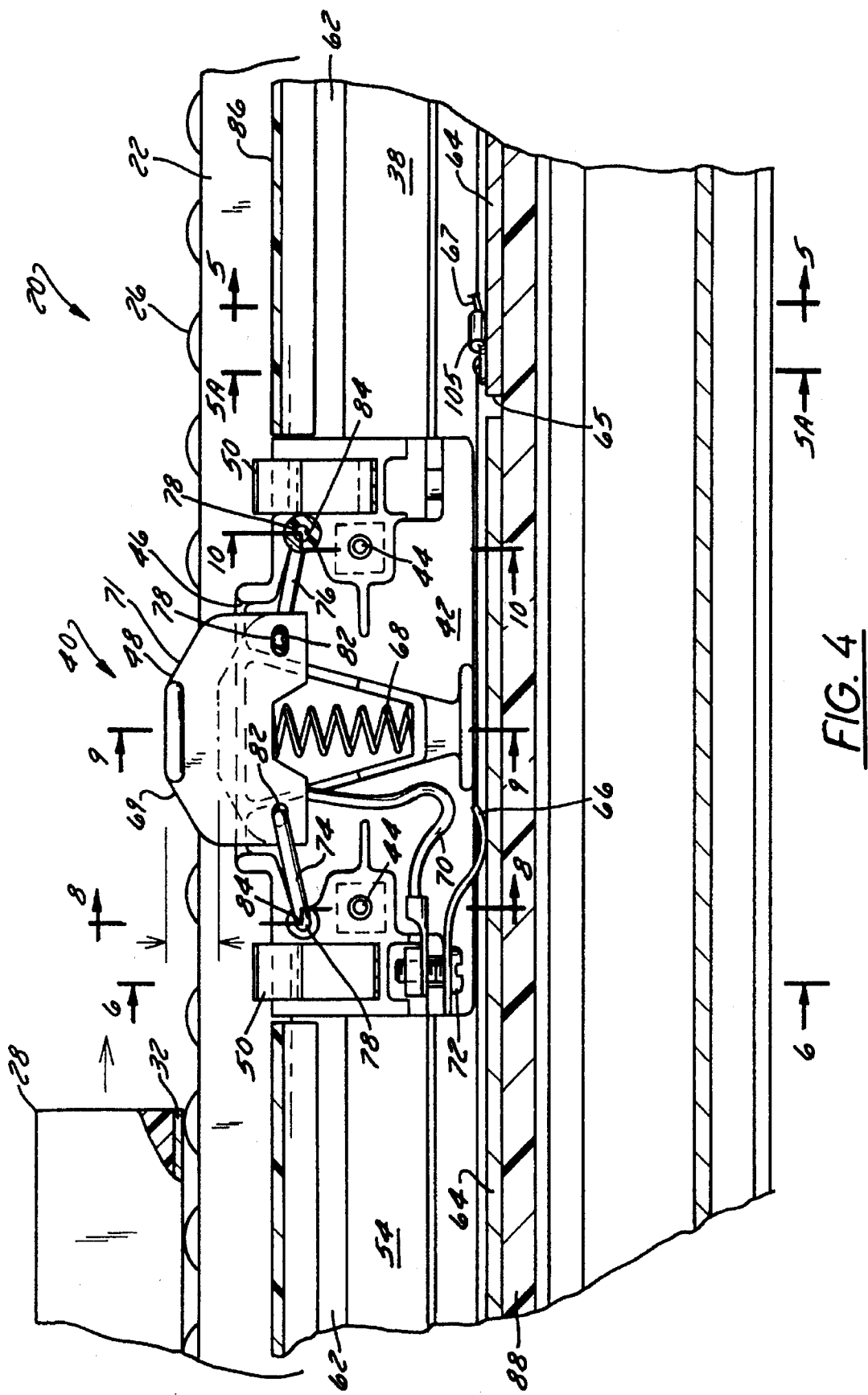
FIG. 4 is a broken-away side sectional view of the conveyor of FIG. 1, showing one of the electrification modules.

FIG. 4 is a side sectional view showing one of the modules 40 mounted on the conveyor 20. In this view it can be seen that the conducting strip 64 is not continuous, being broken at the point 65, to the right of the module 40. The purpose of the break 65 is to limit the amount of current that is carried by the conducting strip 64. If the conveyor 20 is long, or if it is carrying products such as clothes dryers, which draw a large current, then the conducting strip 64 would have to carry a very large current along its entire length in order to power all the products, if the conducting strip 64 were continuous. By breaking up the conducting strip 64 into parts which are spaced from each other, the conveyor is divided into sections, each of which receives its own power. To the right of the break 65 in the conducting strip 64 is a wire 67, which brings power to the right portion of the conducting strip 64. That power would not be transmitted past the break 65, so the left portion of the conducting strip 64, which is beneath the module 40 shown in FIG. 4, would receive power from another, similar wire (not shown).

In FIG. 4, half of the housing 42 is removed, so the interior of the module 40 is visible. It can be seen that there is an electrical lead 66 on the module 40, which contacts the conducting strip 64 that extends along the electrification rail 38. In this preferred embodiment, the electrical lead 66 is a spring clip, which exerts some force against the conducting strip 64 in order to ensure good contact.

The shoe 48, which provides electrical contact with the strip 32 on the pallet 28, is biased upwardly by a spring 68. The shoe 48 has tapered front and rear edges 69, 71, which allow a pallet 28 to ease over the shoe 48 when moving forward or backward over the shoe 48. The spring 68 is housed inside the non-conductive material of the housing 42, so it does not conduct electricity from the shoe 48. The spring 68 is received in a circular indentation in the bottom of the shoe 48, so that it stays in place. There is a wire 70 which extends from the shoe 48 to the screw 72 which holds the lead 66 in place, so there is a conductive path from the conductive strip 64 on the rail 38, through the lead 66, through the screw 72, along the wire 70, to the shoe 48.

The shoe 48 must be able to shift up and down in the housing 42 as pallets pass over it, but it is desirable to prevent the shoe 48 from pivoting sideways as the pallet 28 passes over it, so there are two toe bars 74, 76 mounted on the shoe 48 to prevent pivoting. As shown more clearly in FIG. 7, each toe bar 74, 76 is a substantially U-shaped member, with two legs 78 which define an opening 80 between them. Each of the toe bars 74, 76 has one leg 78 extending into a left-to-right hole 82 in the shoe 48, and the other leg 78 extending into a left-to-right hole 84 in the housing 42. The forward toe bar 74 extends in from the right side, and the rear toe bar 76 extends in from the left side. The toe bars 74, 76 can pivot relative to the holes 82, 84, thereby permitting the shoe 48 to move up and down, but the toe bars 74, 76 resist movement in any other direction, thereby preventing the shoe 48 from pivoting sideways.

Figure 5:
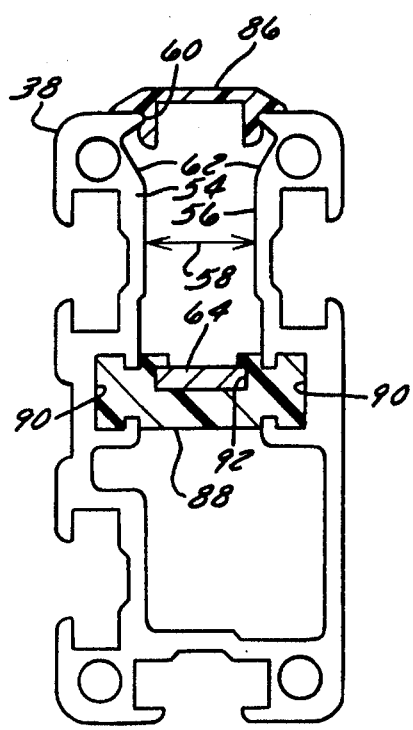
FIG. 5 is a view taken along the section 5—5 of FIG. 4.

FIG. 5 shows the electrification rail 38 in a portion beyond the module 40. In this area can be seen a snap-in cover 86, to keep hands and other objects out of the electrification rail 38. The snap-in cover 86 extends along the rail 38 anywhere there is not a module 40. Also shown in section in this view is the support member 88 which carries the electrically conducting strip 64, which runs along the length of the rail 38. The support member 88 is made of a non-conducting material, preferably plastic. The rail 38 defines opposed T-slots 90, and the support member 88 has a contour which fits into those opposed T-slots 90, to hold the support 88 on the rail 38. The top surface of the support 88 also defines a T-shaped slot 92, which receives the conductor strip 64. The support 88 and conductor strip 64 run the full length of the rail 38 (the conductor strip 64 may be broken into parts, as was described earlier).

Figure 5A:
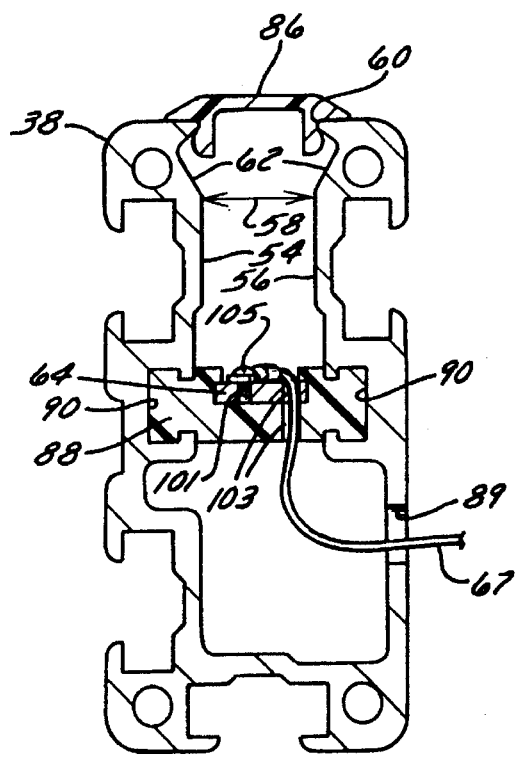
FIG. 5A is taken along the section 5A—5A of FIG. 4.

FIG. 5A is essentially the same view as FIG. 5, except that it shows the manner in which power is brought to the conductor strip 64. Power is brought to the conducting strip 64 by the wire 67, as was explained with respect to FIG. 4. The wire 67 enters the rail through a hole 89 drilled in the rail 38. A drill (not shown) is inserted through the top opening 60 in the rail 38 and drills two holes 101, 103 into the conductor strip 64. The hole 103 extends all the way through the support 88 in order to permit the wire 67 to come up through the support 88 and the conductor strip 64. The free end of the wire 67 is then fastened down to the conductor strip 64 by a screw 105, which is threaded into the hole 101. If power is brought to the conductor strip 64 at intervals along the conveyor, wires 67 will enter the rails at intervals along the conveyor, as shown in FIG. 3A. It is expected that several modules 40 would be powered by each wire 67.

Figure 6:
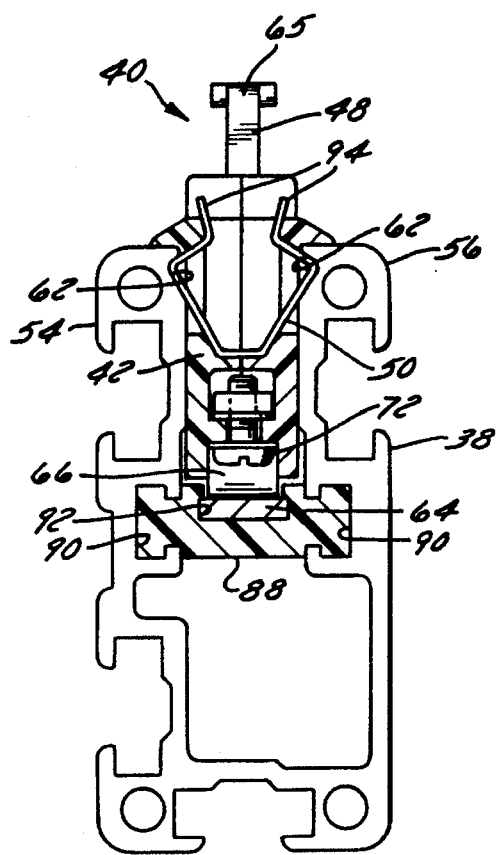
FIG. 6 is a view taken along the section 6—6 of FIG. 4.

FIG. 6 shows the support 88, the conducting strip 64, and the electrical lead 66, which is in contact with the strip 64. It also shows one of the clips 50 retained in the V-shaped grooves 62 of the rail 38. It is clear in this view that the free legs 94 of the clip 50 extend out the top of the module 40, so a person can squeeze together the legs 94 on the two clips 50 to lift the module 40 out of the rail 38 from the top. This view also shows that the shoe 48 has a generally T-shaped cross-section. This is very useful for two reasons. First, the T-shaped cross-section gives the shoe 48 a wider area of contact with the pallet than it would have without the T-shaped top portion. Also, the T-shaped cross-section provides an indication of wear. Upon a quick visual inspection, it is easy to tell how worn the shoe 48 is, and, as the top of the T becomes thinner, the operator of the conveyor can make plans to replace the shoes 48.

Figure 7:
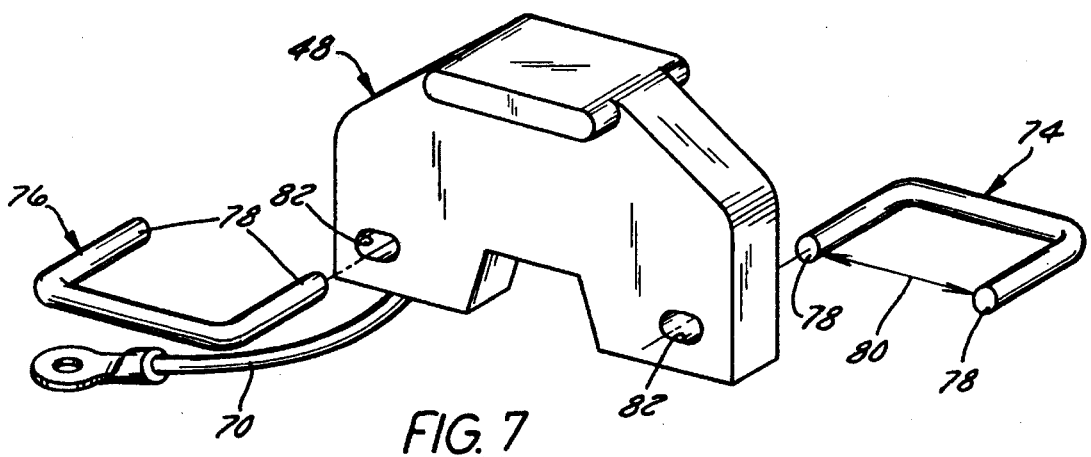
FIG. 7 is an exploded perspective view of the shoe and toe bars of the module of FIG. 2.

FIG. 7 is a perspective view of the shoe 48, with holes 82 and with toe bars 74, 76, which have legs 78, extending into the holes 82. This view also shows the wire 70, extending from the shoe 48.

Figure 8:
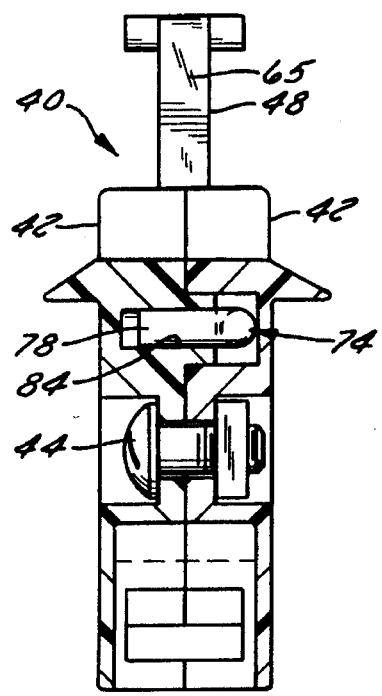
FIG. 8 is taken along the section 8—8 of FIG. 4.
Figure 9:
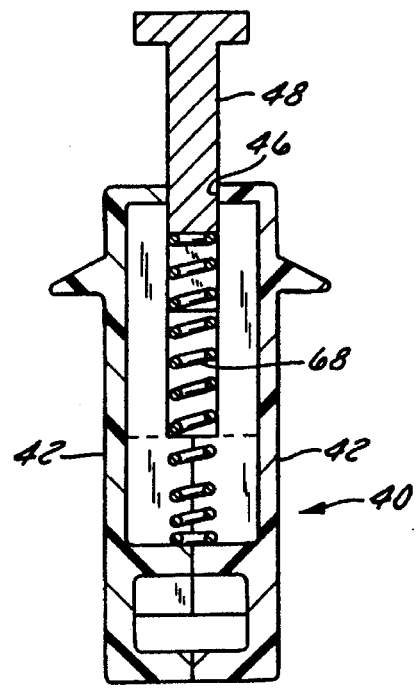
FIG. 9 is taken along the section 9—9 of FIG. 4.
Figure 10:
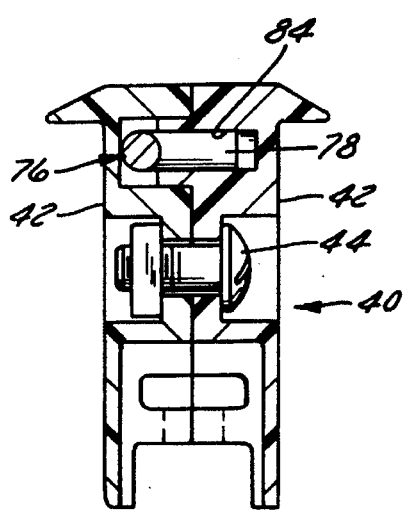
FIG. 10 is taken along the section 10—10 of FIG. 4.

FIG. 8 is a view through the toe bar 74. FIG. 9 is a view through the center of the module 40, showing the spring 68, biasing the shoe 48 upwardly. FIG. 10 is a section through the rear toe bar 76, showing the portion of the toe bar 76 which extends into the hole 84 of the housing 42.

Figure 11:
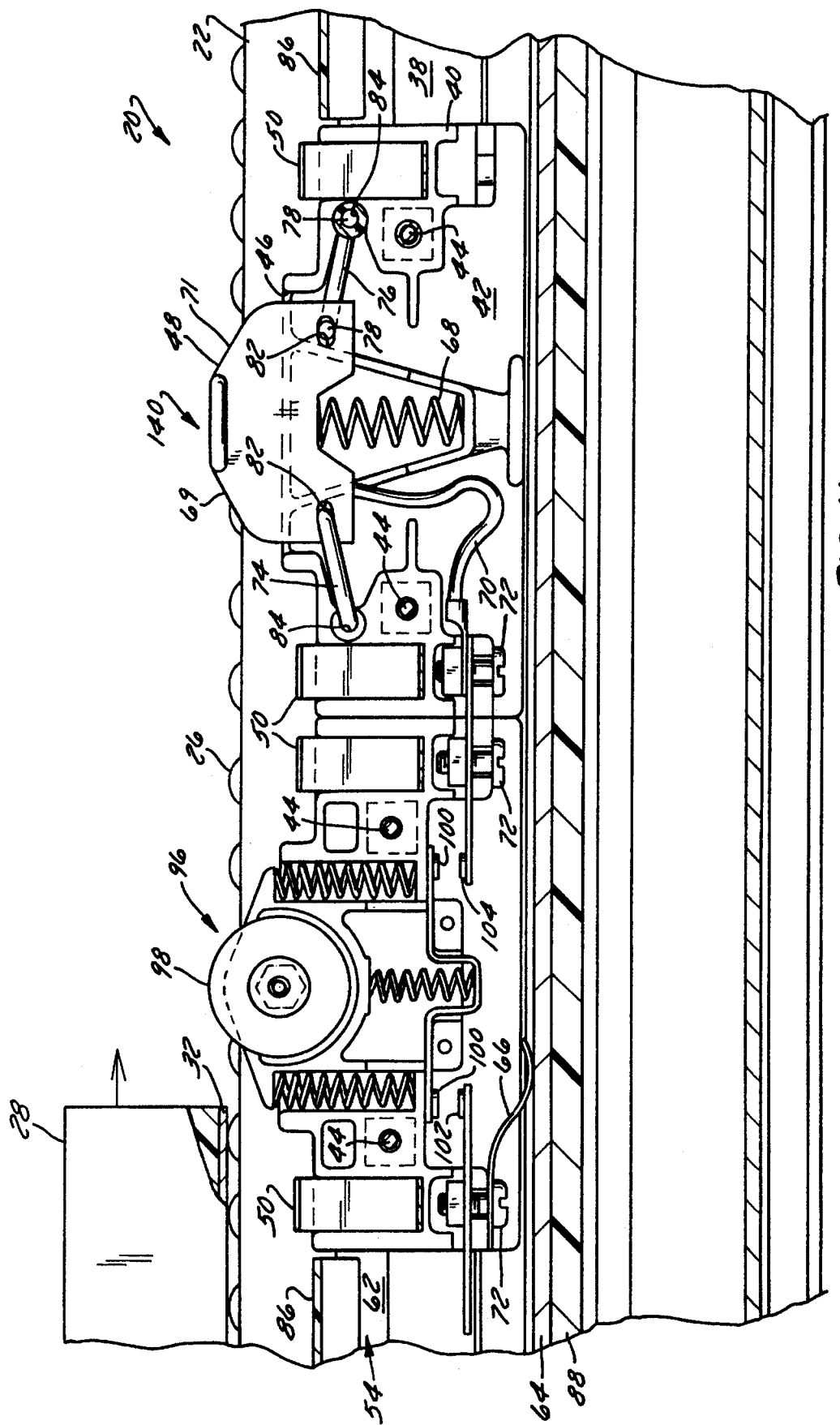
FIG. 11 is a broken-away side sectional view of the conveyor of FIG. 1, but with a switch added to the electrification module.
Figure 12:
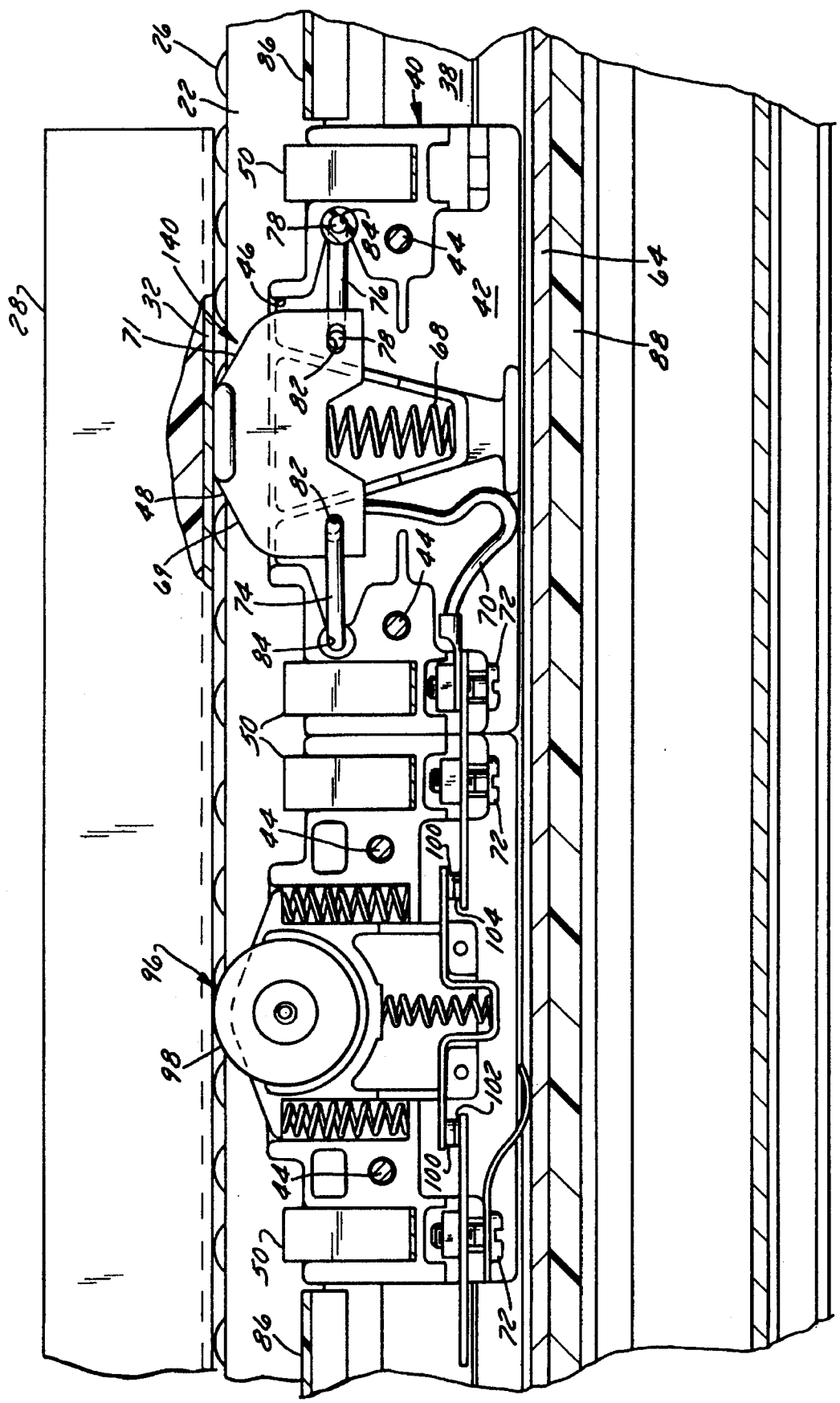
FIG. 12 is the same view as FIG. 11, but with the pallet on top of the electrification module.

FIG. 11 shows a modification of the module of FIG. 4. In this embodiment, the module 140 is identical to the module 40 of FIG. 4, except that, in this module 140, a switch 96 has been added, so that electricity passes from the conducting strip 64, through the lead 66, through the switch 96, then through the wire 70, to the shoe 48. The switch 96 includes a spring-biased roller 98, and a pair of electrically-connected upper contacts 100, which move up and down as the roller 96 moves up and down. There is also a lower contact 102, which is connected to the electrical lead 66, and a lower contact 104 which is connected through the wire 70 to the shoe 48. When the roller 98 is biased upwardly, the switch 96 is open, and no electricity passes to the shoe 48. When the roller 98 is pushed down by the pallet 28, there is contact between the upper contacts 100 and the lower contacts 102, 104, providing an electrical path from the conducting strip 64 on the rail to the shoe 48. Thus, the switch 96 provides that electricity flows to the shoe 48 only when there is a pallet 28 over the shoe 48. FIG. 12 shows the switch 96 in the closed position.

It will be obvious to those skilled in the art that modifications may be made to the embodiments described above without departing from the scope of the present invention.

What is claimed is:

1. An electrification module for providing electricity to a pallet on a conveyor, said module defining left and right sides and forward and rear ends, and comprising:

an electrification module housing;

an electrical lead from said housing for connecting to an electrical line; and a spring-biased electrically-conducting shoe projecting upwardly from said housing for contacting a pallet, said shoe having a substantially T-shaped cross-section, so as to provide a wide surface area of contact with the pallet, and so as to provide a visual indicator of the amount of wear.

2. An electrification module as recited in claim 1, and further comprising an elongated rail having two sides and defining a top opening, wherein said module lies between said sides and the shoe of said module projects through said top opening, wherein said sides define grooves, and wherein said module includes a plurality of spring clips, which extend into said grooves, so that said module can be inserted into said rail by pushing it down, through said top opening, until said spring clips project into said grooves.

3. A module as recited in claim 1, and further comprising a switch mounted on said module, said switch including a spring-biased member which projects up from the top of said module, such that, when said spring-biased member is in the up position, the switch is open, and, when said spring-biased member is pushed down by a pallet, it closes the switch.

4. An electrification module as recited in claim 1, further comprising forward and rear toe bars connecting said shoe to said module housing, each of said toe bars having two legs, one leg received in said shoe and one leg received in said housing.

5. An electrification module as recited in claim 4, wherein each of said toe bars is substantially U-shaped, defining an open end, and wherein the forward toe bar opens to one side and the rear toe bar opens to the other side.

6. An electrification module for providing electricity to a pallet on a conveyor, said module defining left and right sides and forward and rear ends, and comprising:

an electrification module housing;

an electrical lead from said housing for connecting to an electrical line;

a spring-biased electrically-conducting shoe projecting upwardly from said housing for contacting a pallet; and a first substantially U-shaped bar having two legs, one of said legs extending into a left-to-right-directed hole in said housing and the other of said legs extending into a left-to-right-directed hole in said shoe, so that said U-shaped bar pivots to allow said shoe to move up and down while preventing said shoe from pivoting sideways.

7. An electrification module as recited in claim 6, and further comprising a second substantially U-shaped bar, mounted in the same manner as said first U-shaped bar, with one of said bars mounted at the forward end of said shoe and the other of said bars mounted at the rear end of said shoe, wherein one of said bars opens to the left and the other opens to the right.

8. A conveyor, comprising:

left and right conveyor rails;

chains mounted on said rails for carrying a pallet;

at least one electrification rail extending parallel to said conveyor rails, said electrification rail having left and right sides defining a top opening, wherein each of said sides defines an elongated groove; and having an electrical line running along the length of said electrification rail;

a plurality of electrification modules mounted on said electrification rail; each of said electrification modules including a lead for connecting to said electrical line; a shoe which projects up through said top opening to contact a pallet; and forward and rear spring clips, which clip into the grooves of said left and right sides of said electrification rail, so that said module can be inserted into the electrification rail from the top, pushing the module downwardly until the clips project into the grooves, holding the module on the rail.

9. A conveyor as recited in claim 8, wherein said clips extend out the top of said module, so they can be reached from the top of said conveyor and can be retracted in order to remove the module from the top.

10. A conveyor as recited in claim 9, wherein said grooves are V-shaped.

* * * * *